United States Patent
Brink et al.

(10) Patent No.: US 12,379,724 B2
(45) Date of Patent: Aug. 5, 2025

(54) METHOD AND ARRANGEMENT FOR BARN CLEANING

(71) Applicant: DELAVAL HOLDING AB, Tumba (SE)

(72) Inventors: Marek Brink, Tumba (SE); Józef Furdak, Tumba (SE); Bartlomiej Jaklik, Tumba (SE); Bartlomiej Slusarczyk, Tumba (SE)

(73) Assignee: DeLaval Holding AB, Tumba (SE)

( * ) Notice: Subject to any disclaimer, the term of this patent is extended or adjusted under 35 U.S.C. 154(b) by 566 days.

(21) Appl. No.: 17/634,667

(22) PCT Filed: Jul. 24, 2020

(86) PCT No.: PCT/SE2020/050751
§ 371 (c)(1),
(2) Date: Feb. 11, 2022

(87) PCT Pub. No.: WO2021/029807
PCT Pub. Date: Feb. 18, 2021

(65) Prior Publication Data
US 2022/0350334 A1 Nov. 3, 2022

(30) Foreign Application Priority Data
Aug. 13, 2019 (SE) .................... 1950927-2

(51) Int. Cl.
*G05D 1/00* (2024.01)
*A01K 1/01* (2006.01)
(52) U.S. Cl.
CPC ......... *G05D 1/0212* (2013.01); *A01K 1/0128* (2013.01)

(58) Field of Classification Search
None
See application file for complete search history.

(56) References Cited

U.S. PATENT DOCUMENTS

2012/0247510 A1* 10/2012 Chen .................... G05D 1/0219
134/18
2015/0223427 A1 8/2015 Agayev et al.

FOREIGN PATENT DOCUMENTS

| CN | 109 220 825 | 1/2019 |
| EP | 1 564 664 | 8/2005 |

(Continued)

OTHER PUBLICATIONS

CN 109220825 English translation, accessed on May 2024. (Year: 2019).*

(Continued)

*Primary Examiner* — Michael E Barr
*Assistant Examiner* — Arlyn I Rivera-Cordero
(74) *Attorney, Agent, or Firm* — NIXON & VANDERHYE

(57) ABSTRACT

A method, controller, computer program and arrangement for barn cleaning obtaining information from one or more cameras mounted to capture images of an area of operation of an automatic barn cleaning device and identifying at least one location in said area of operation being subjected to manure, based on the obtained information. The method further calculates a route for the automatic barn cleaning device based on the identified at least one location, and controls the automatic barn cleaning device based on the calculated route.

16 Claims, 4 Drawing Sheets

(56) References Cited

FOREIGN PATENT DOCUMENTS

| EP | 2 227 945 | 9/2010 |
|----|-----------|--------|
| EP | 3 102 025 | 12/2016 |
| GB | 2529166 | 2/2016 |
| WO | 2005/084421 | 9/2005 |

OTHER PUBLICATIONS

International Search Report for PCT/SE2020/050751 mailed Oct. 16, 2020, 4 pages.
Written Opinion of the ISA for PCT/SE2020/050751 mailed Oct. 16, 2020, 6 pages.
Swedish Search Report for SE1950927-2 maiked Feb. 11, 2020, 2 pages.

* cited by examiner ated by a chain, rope or wire.
METHOD AND ARRANGEMENT FOR BARN CLEANING This application is the U.S. national phase of International Application No. PCT/SE2020/050751 filed Jul. 24, 2020 which designated the U.S. and claims priority to Swedish Patent Application No. 1950927-2 filed Aug. 13, 2019, the entire contents of each of which are hereby incorporated by reference.

TECHNICAL FIELD

The present invention generally relates to cleaning efficiency in animal husbandry, and in particular the invention relates to cleaning efficiency in regard of automatic barn cleaning devices.

BACKGROUND

One inevitable consequence of animal husbandry is handling of animal excrements. Removal of animal excrements will herein be referred to as "barn cleaning". Further, animal excrements will herein be referred to as "manure", although there are many other words used for the excrements of different animal types, etc., such as "effluents" or "droppings". There are a number of different solutions for automatic barn cleaning, such as various autonomous vehicles displacing or collecting the manure, or scrapers, which are typically pulled along an alley by a chain, rope or wire. Common for these solutions are that they operate on a predefined track, typically according to a predefined time schedule. Thereby, the automatic barn cleaning devices run their cleaning routines irrespective of whether cleaning is needed or not, i.e. regardless of the amount of manure to clear. This is identified as inefficient.

SUMMARY

According to a first aspect, a method for barn cleaning is provided. The method is intended to be applied by a barn cleaning control unit according to a second aspect (below). The method comprises obtaining of information from one or more cameras mounted such as to capture images of an area of operation of an automatic barn cleaning device and identifying of at least one location in said area of operation being subjected to manure, based on the obtained information. The method further comprises calculating of a route for the automatic barn cleaning device based on the identified at least one location, and controlling of the automatic barn cleaning device based on the calculated route.

The method provides a more efficient cleaning compared to other known solutions for barn cleaning. The method enables cleaning only when and where needed, instead of running scheduled cleaning sessions following a standard route.

The barn cleaning device may be an autonomous vehicle for clearing or cleaning the barn from manure. It is controlled to travel along the calculated route, and is operated to displacing or collecting manure on the floor of the barn, along the travelled route. The automatic barn cleaning device is suitable for automatic cleaning of a barn in which dairy animals are kept, such as e.g. cow, buffalo, sheep or goat. In a preferred case, the automatic barn cleaning device is a cleaning robot, an autonomous barn cleaning vehicle, that can be controlled to navigate and move on the floor, relatively freely, in two physical dimensions, i.e. is not mechanically bound to a fixed track. Such a barn cleaning vehicle may be supported and propelled on the floor by means of a set of wheels or the like, known in the art. The route of the automatic barn cleaning vehicle is the path on the floor (in two dimensions) along which the automatic barn cleaning vehicle is controlled to move in order to displace or collect the manure. The barn cleaning vehicle typically comprises a scraper attached to the vehicle for displacing manure, a manure suction device or a continuous manure pickup device such as a moving belt etc., thus allowing continuous displacement or collection of manure along the route.

According to some embodiments, the controlling includes a mere triggering of the automatic barn cleaning device to navigate according to the calculated route. The route may e.g. be provided to the automatic barn cleaning device, which thereby may execute the cleaning along the route in an efficient manner.

According to some embodiments the method comprises identifying a plurality of locations in said area of operation being subjected to manure. The calculating of a route is based on the plurality of identified locations in said area. Thus the calculated route comprises a plurality of such identified locations being subjected to manure. This makes the method more efficient, since more is gained when more locations are to be traversed, and thus cleaned, along the calculated route. The route may be dynamically updated when new locations are identified.

According to some embodiments, the identifying of at least one location includes estimating of an amount of manure present at the at least one identified location. This enables prediction of whether the automatic barn cleaning device will be able to displace or collect the manure along a route.

According to some embodiments the calculation of a route is further based on an estimated amount of manure present at the at least one identified location. This means that the route can be calculated e.g. under a constraint in terms of amount of manure, such that the capacity of the automatic barn cleaning device is not exceeded during a calculated route.

According to some embodiments, the method further comprises determining a current position of the automatic barn cleaning device. This enables a more precise and adequate calculation of a route, since the start position of the automatic barn cleaning device is known. According to some embodiments the route calculated such as to fulfill a predefined criterion. This enables e.g. use of a restriction in terms of a maximum or minimum amount of manure to be collected when traversing the route; or a minimum number of identified locations to be traversed by the route. This is beneficial in order e.g. not to run the automatic barn cleaning device with overload, nor to start working for any small amount of manure.

According to some embodiments the calculating of a route comprises calculating of a number of alternative paths, and then selecting the path which maximizes an estimated amount of manure traversed by said path per length unit and/or per time unit. This enables calculation of a very efficient route. Further, the allowed amount of manure to be traversed by a calculated path may be restricted by a maximum capacity of the automatic barn cleaning device. This enables calculation and selection of a path/route that exploits the capacity of the automatic barn cleaning device in full.

According to some embodiments, the calculating of a route comprises calculating of a shortest path, starting from a/the position of the automatic barn cleaning device, passing through a plurality of identified locations. Short is beneficial and efficient.

According to some embodiments, the calculating of a route includes selecting a subset of a total number of identified locations to be covered by the route. For example, the subset can be selected such that it fulfills a predefined criterion. The criterion may be related to an estimated total amount of manure present in the locations of the subset, or, be related to a predicted energy consumption of the automatic barn cleaning device when traversing a route passing through the locations of the subset. The selection of a subset enables, among other things, prioritizing of some parts of the area of operation.

The automatic barn cleaning device in embodiments described herein is preferably a robot, which can be controlled to navigate in two physical dimension, such as an x,y-plane.

According to a second aspect a barn cleaning control unit is provided, for applying the method according to the first aspect. The barn cleaning control unit is operable to control an automatic barn cleaning device. The control unit is configured to obtain information from one or more cameras, said information being related to an area of operation of an automatic barn cleaning device; to identify at least one location in said area of operation being subjected to manure, based on the obtained information. The control unit is further configured to calculate a route for the automatic barn cleaning device based on the identified at least one location and to control the automatic barn cleaning device based on the calculated route.

According to some embodiments, the identifying of at least one location further includes estimating an amount of manure present at the identified location.

According to some embodiments, the calculating of a route is further based on an estimated amount of manure present at the at least one identified location.

According to some embodiments, the barn cleaning control unit is further configured to determine a current position of the automatic barn cleaning device, and the calculating of a route is further based on the determined current position of the automatic barn cleaning device.

According to some embodiments, the barn cleaning control unit is further configured to, as a part of calculating a route, calculate a number of alternative paths and select the path which maximizes an estimated amount of manure traversed by said path per length unit and/or per time unit.

According to some embodiments the calculating of a route comprises calculating of a shortest path, starting from a/the position of the automatic barn cleaning device, passing through a plurality of identified locations.

According to some embodiments, the barn cleaning control unit is further configured to, as a part of calculating a route, select a subset of a total number of identified locations to be covered by the route. The subset may be selected such as to satisfy a criterion related to an estimated total amount of manure present in the locations of the subset, or, related to a predicted energy consumption of the automatic barn cleaning device when traversing a route passing through the locations of the subset. The subset may also be selected in other ways, as in the method according to the first aspect.

According to a third aspect, a computer program is provided, comprising comprising instructions, which, when executed by at least one processing circuitry of a barn cleaning control unit according to the second aspect, causes the barn cleaning control unit to carry out the method according to the first aspect.

According to a fourth aspect, a barn cleaning arrangement is provided, which comprises an automatic barn cleaning device and a barn cleaning control unit according to the second aspect. In some embodiments, the barn cleaning arrangement further comprises the one or more cameras operable to provide information related to an area of operation of the automatic barn cleaning device. In some embodiments, the automatic barn cleaning device is a robot, which preferably can be controlled to navigate in two physical dimension, such as an x,y-plane.

BRIEF DESCRIPTION OF THE DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

Figure 1:
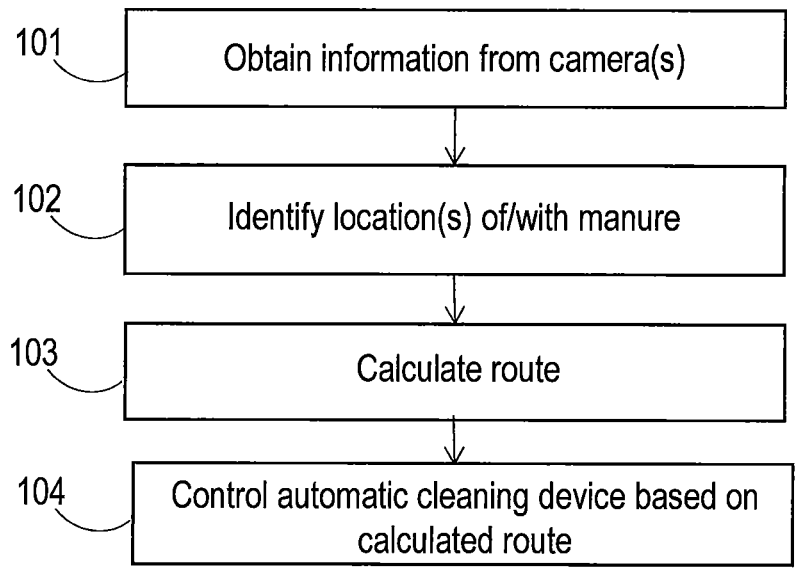
FIGS. 1-4 are flow charts illustrating a method according to exemplifying embodiments.

As previously mentioned, there are many different automatic solutions for cleaning a barn, such as a dairy barn. There are battery driven autonomous vehicles developed for this purpose, which may be equipped with various means for navigation. For example, induction lines or magnetic stripes could be fixed in the floor, and the autonomous vehicle could be provided with sensors, which enable the vehicle to be guided by the lines or stripes. Alternatively, the navigation could be performed by means of beacons or transponders placed along a predetermined route, detectable by the autonomous device. The navigation means may thus lead the autonomous device along a predetermined route, which is designed to cover, at some point, as many parts as possible of a barn which need cleaning. A cleaning schedule is normally preprogrammed based on time, such that the automatic barn cleaning device is started and run at certain periods during the day and/or night.

Embodiments of the subject matter described herein could with advantage be used for improving the efficiency of automatic barn cleaning. For example, energy consumption could be minimized by only cleaning when and where needed, and also by ensuring that an automatic barn cleaning device does not travel further than absolute necessary to get the job done. Such embodiments could involve one or more cameras having at least part of the area of operation in its/their field of view. Thereby, images captured by the camera(s) may be analyzed by means of image processing, and the actual need and/or amount of manure to be cleared may be estimated in real-time, or close to real-time. Information derived based on the images may then be used for controlling the operation of an automatic barn cleaning device. According to embodiments of the invention, cameras mounted e.g. on a wall or in the ceiling, capture images of an area of operation of an automatic barn cleaning device, and these images may then be processed by image processing software run on a processing unit, which may perform object recognition in regard of presence of manure in the area. The image processing will in this case be especially trained or otherwise adapted to detect and identify manure. How this may be achieved will be described in more detail further below.

Thereby, occurrence of manure in an area of operation of an automatic barn cleaning device may be detected and identified in real-time, or close to real-time and an appropriate action could be initiated in response to such identification. For example, the automatic barn cleaning device could be controlled to take the most energy saving route through a number of identified gatherings of manure (locations comprising/exhibiting manure). Thereby, energy resources could be saved, and further, animals would be less disturbed, since the automatic cleaning device would only run when necessary, and e.g. as short a distance as possible. The software and/or processing device could be configured to have special rules e.g. depending on where in the area of operation the manure is identified, e.g. some areas may have higher priority and should be cleared right away, while others may be of slightly less importance that could wait until some further manure locations are identified before being attended to.

Exemplifying Embodiments of Method, FIGS. 1-4

Below, exemplifying embodiments of a method will be described with reference to FIGS. 1-4. The embodiments are intended to be performed by a barn cleaning control unit which is associated with an automatic barn cleaning device. The term "associated with" is here intended to cover at least that the control unit is operatively connected to the automatic barn cleaning device. The control unit will be described in more detail further below in association with FIG. 5. An example of an automatic barn cleaning device is e.g. an autonomous vehicle operable to clear (clean) a barn from manure, e.g. by displacing or collecting the manure. The automatic barn cleaning device is suitable for automatic cleaning of a barn in which dairy animals are kept, such as e.g. cow, buffalo, sheep or goat. In a preferred case, the automatic barn cleaning device is a cleaning robot, which can be controlled to navigate and move on the floor, relatively freely, in two physical dimensions, i.e. is not mechanically bound to a fixed track.

FIG. 1 shows an exemplifying method embodiment for barn cleaning to be applied by a barn cleaning control unit. The method illustrated in FIG. 1 comprises an action 101, of obtaining information from one or more cameras being mounted such as to capture images of an area of operation of an automatic barn cleaning device. The method in FIG. 1 further comprises an action 102, of identifying at least one location in said area of operation being subjected to manure, based on the obtained information. The method in FIG. 1 further comprises an action 103, of calculating a route for the automatic barn cleaning device based on the identified at least one location; and further an action 104 of controlling the automatic barn cleaning device based on the calculated route.

The one or more cameras, from which the information is obtained 101, may be assumed to be operable to capture images of an area of a barn, in which area one or more automatic barn cleaning devices are employed. This area could include e.g. walking alleys between resting areas or next to a feeding table; waiting areas, resting cubicles, and other areas where manure may occur and where automatic barn cleaning devices are capable of cleaning. Each camera could be mounted and/or configured such as to capture images of a larger or smaller part of a total area of operation. The area of operation may typically be the full length of an alley in a barn, or the full area of operation of the automatic cleaning device. Several automatic cleaning devices may be operable to clean a barn of manure, and they may thus have individual areas of operation. The area of operation might also cover the area of operation of several automatic cleaning devices. The area of operation may include several alleys in the barn, or all areas of the barn where the animals are allowed to move, and thus that may be subjected to manure. The parts covered by each camera may add up to the total area of operation, or, parts of an area of operation that are not covered by any camera could be handled in a standard manner. In order to enable identification of manure locations based on information from a camera, the position and/or orientation of field of view of the camera in relation to the area of operation of the automatic barn cleaning device should be known. For example, the field of view of each camera could be related/correlated, manually or automatically, to a map over the barn, which map may be provided to the barn cleaning control unit either manually, or e.g. be derived based on the movements of the automatic barn cleaning device. One way to achieve this is to methodically navigate the automatic barn cleaning device over the area of operation and observe when it is in the field of view of the one or more cameras, and correlate a position in the field of view with a known actual position of the automatic barn cleaning device in the area of operation.

The one or more cameras could preferably be relatively inexpensive 2D cameras, such as RGB-cameras. The information provided by such cameras has been found by the inventors to be sufficient for modern image recognition software, with adequate adaptation and/or training, to identify the occurrence of manure, also in liquid form. Optionally one or more cameras could be IR-cameras, or 2D-cameras having additional capability of capturing infrared, or thermographic, images. This would facilitate, or even enable, detection of fresh manure during night time, e.g. since the temperature initially is higher than that of the surrounding. Depending on the capacity of a communication channel between the one or more cameras and the barn cleaning control unit, at least part of the signal processing necessary for analysis of the images could be performed by or close to the cameras, before being transferred to the control unit. Deep learning or less advanced machine learning could be applied in order to teach the image processing software to recognize manure and identify locations comprising manure. In a preferred case, a plurality of locations subjected to manure are identified before a route is calculated.

The term "locations subjected to manure" is intended to mean that there is animal excrements in this location, such as a puddle of cow droppings. The identified location could be expressed e.g. as coordinates of a central point of a detected manure puddle, which could also be associated with an indication of an estimated amount of manure in the manure finding, which will be described further below. Such coordinates and e.g. associated estimated amount of manure, could be stored e.g. in a simple data record or database or other structure, e.g. in form of a list or a map. Such a data record could be dynamically updated by adding new locations that are identified, and removing locations that have been cleared from manure. The calculation of a route could then be based on the stored information, comprising a set of identified (not-yet-cleaned) locations.

The route may be calculated in different ways. In a preferred embodiment the route is calculated based on a plurality of identified locations. The calculating of a route may include calculating a number of alternative paths and selecting (from amongst the alternative paths) as a route, the path which fulfills a predefined criterion. For example, the path could be selected which maximizes an estimated amount of manure traversed by said path per length unit and/or per time unit; e.g. collecting the most manure per meter. This selected path would then be the route based on which the automatic barn cleaning device would be controlled. Further, a subset of a total number of identified locations (subjected to manure) could be selected to be covered by the route. This subset could be selected such as to fulfill a criterion e.g. related to a remaining maximum capacity of the automatic barn cleaning device in terms of manure or energy consumption. That is, the subset could be selected based on an estimated total amount of manure present in the locations of the subset, or, related to a predicted energy consumption of the automatic barn cleaning device when traversing a route passing through the locations of the subset. This will be further described below.

The calculated route should be used to control the automatic barn cleaning device, e.g. in terms of navigation. For example, the controlling could include triggering the automatic barn cleaning device to navigate according to the calculated route. The route could be communicated to, or be otherwise imposed on, the automatic barn cleaning device in order to enable it to take an efficient route when cleaning.

Figure 2:
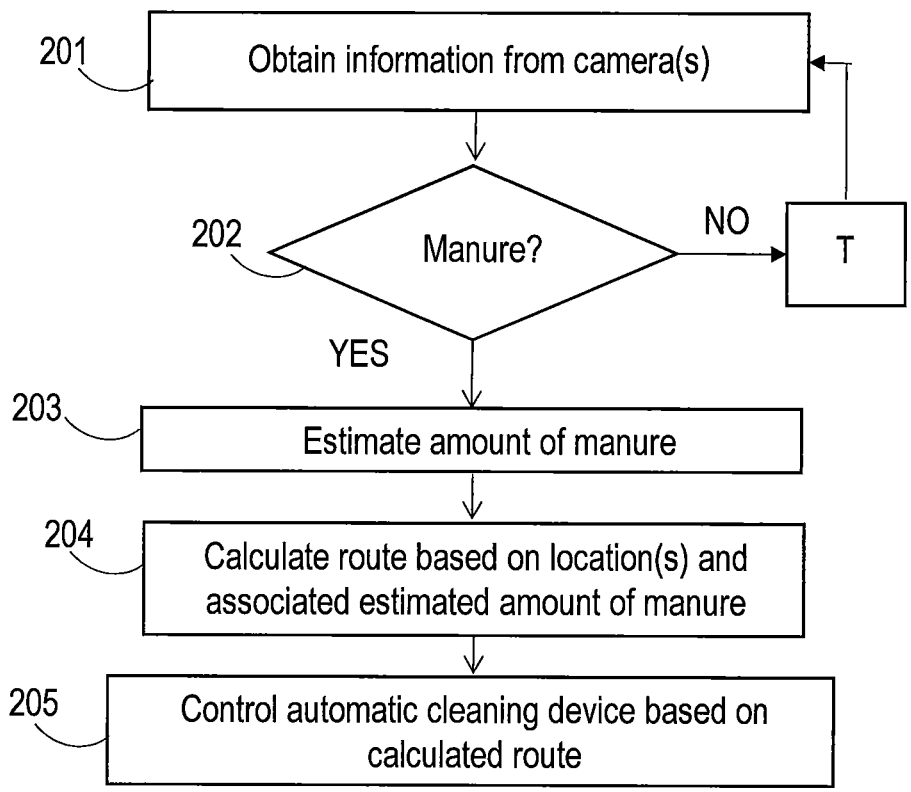

FIG. 2 also shows an exemplifying method embodiment. The method illustrated in FIG. 2 comprises an action 201, of obtaining information from one or more cameras. The method in FIG. 2 further comprises an action 202, of determining whether manure is present in any location in the area of operation of the automatic barn cleaning device, based on the obtained information. When no previously undetected manure locations are identified in action 202, the current operation of the automatic barn cleaning device is maintained. In FIG. 2 this is illustrated as a delay "T". For example, T could be set e.g. to one, five, ten or thirty minutes, depending e.g. on the number of animals in the barn, on a preferred level of cleanliness, or on the time of day. The method in FIG. 2 further comprises an action 203, of estimating an amount of manure present at an identified location. Then, in an action 204, a route for the automatic barn cleaning device is calculated based on the identified one or more locations and the estimated amount of manure in the identified one or more locations. The method illustrated in FIG. 2 further comprises an action 205 of controlling the automatic barn cleaning device based on the calculated route.

The amount of manure in a location may be determined based on the obtained image related information. Features such as the size of a detected manure puddle could be derived from the obtained information and be used to create an estimate. A size of a manure "finding" could be determined based e.g. on a radius; a width and length and possibly height and/or shape of a manure puddle or gathering.

The calculating of a route based on the identified one or more locations and the estimated amount of manure may e.g. include selecting a subset of a total number of identified locations, for which subset the total estimated amount of manure is within the maximum capacity of the automatic barn cleaning device. By maximum capacity is here meant the maximum amount of manure that can be displaced or collected by the automatic barn cleaning device before visiting a drain. The current maximum capacity can vary depending on whether the automatic barn cleaning device is empty, i.e. recently emptied or drained, or whether it already pushes or carries a load of manure due to previous cleaning, e.g. is half-full. Thereby, a route may be calculated for a subset of the identified locations, which ends at a drain, the automatic barn cleaning device being completely fully loaded with manure. A new route may then be calculated for the remaining identified locations, given that the total estimated amount of manure for these remaining locations can be handled within the maximum capacity of the automatic barn cleaning device.

Figure 3:
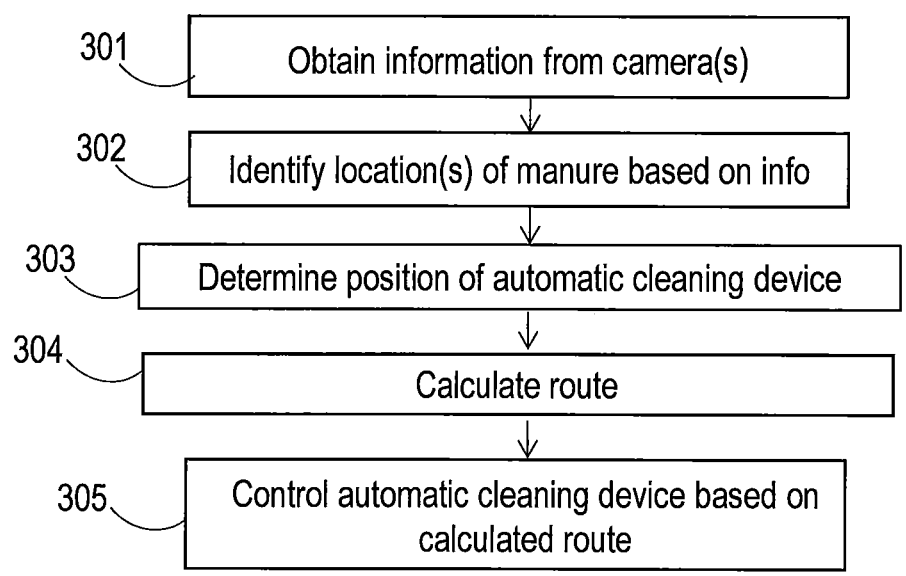

FIG. 3 shows an exemplifying method embodiment, comprising the actions 301, 302 and 305, which may correspond to the actions with similar names in previous embodiments. The method in FIG. 3 further comprises an action 303, of determining the current position of the automatic barn cleaning device. This position could be determined in different ways, which will be described below. The determined position of the automatic barn cleaning device is then used when calculating the route in an action 304.

The advantage of determining a current position of the automatic barn cleaning device and using it when calculating the route is that a more adequate and beneficial route can be calculated for the device. The route can be calculated from the actual position of the automatic barn cleaning device, instead of e.g. from a default position, e.g. a docking station, or an assumed or estimated position of the automatic barn cleaning device. Thereby, a working route of the automatic barn cleaning device could also be dynamically updated during operation, e.g. when a new manure location has been identified and incorporated in a newly (more recently) calculated route.

The current position of the automatic barn cleaning device could be determined e.g. based on the information obtained from the one or more cameras, possibly using the same software as the one identifying the manure locations. Alternatively, or in addition, the barn cleaning control unit could obtain the position of the automatic barn cleaning device by some other means. For example, the automatic barn cleaning device could be navigating by use of beacons, transponders or induction lines, which could indicate where the automatic barn cleaning device is currently located. The automatic barn cleaning device could itself report where it is, e.g. on a route it is currently following. Alternatively, information from a real time location system, RTLS, could be used, given that the automatic barn cleaning device is provided with a tag or other measure in order to be tracked by an RTLS-system, or similar.

A latest version of a determined current position, e.g. coordinates, of the automatic barn cleaning device may be stored in a data structure, such as a list or map, together with identified locations of manure, as described above. The determined current position of the automatic barn cleaning device can then be used as a start position when calculating a route.

As previously mentioned, the identified locations of manure, any estimated amounts of manure and also a determined current position of the automatic barn cleaning device can be stored in some type of data record or structure. One example of such a structure may be a map. Such a map is not intended to be displayed anywhere, but should only serve as a tool for calculating the route. The base of the map may coincide with the earlier mentioned map of the barn provided for configuring the location and/or field of view of cameras. Alternatively or in addition, the boundaries of the map may be derived from information about static objects derived from information obtained from the cameras. The map may also comprise information about the location of drains where the automatic barn cleaning device can be emptied, and possibly other important locations, such as a docking station where the battery of the automatic barn cleaning device can be charged. Note that such information about e.g. structures, drains and docking station may be present in all types of data structures in any embodiments described herein. In all cases the map should comprise a representation of the identified locations, i.e. locations with manure that should be displaced or collected, and their mutual interrelation. The map may be based on coordinates in an absolute or relative coordinate system associated with the area of operation of the automatic barn cleaning device. In a simple example, when the area of operation is rectangular, the map may be based on an "x,y"-coordinate system where each axis follows one side of the area. The identified manure locations will then be inserted with their coordinates in the map. The map may comprise representations of static obstacles in the area of operation, such as stalling equipment, walls or pillars, thus enabling such obstacles to be taken into consideration when calculating a route. The position of the barn cleaning device may also be represented in the map. The positions of moving or semi-static obstacles, such as animals or at least lying animals, may also be considered in the map, if desired, in cases where obstacle detection for detecting such moving of semi-static obstacles is used. Alternatively, such obstacles may be handled separately.

Figure 4A:
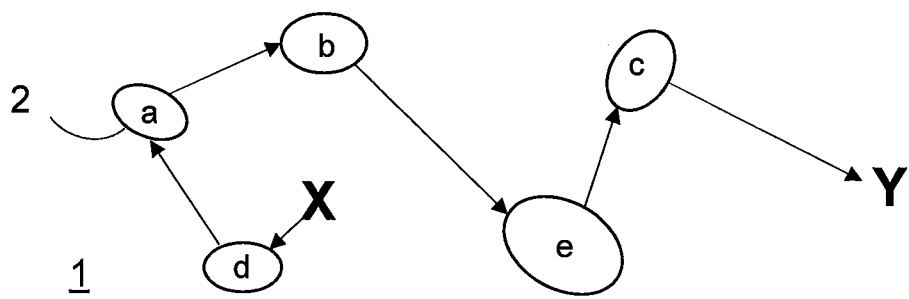

FIG. 4a shows an exemplifying set of identified locations 2, a-e, subjected to, i.e. comprising and exhibiting manure in a barn alley 1. The "X" symbolizes the position of an automatic barn cleaning device, and the "Y" symbolizes a location of a drain. The manure should be cleared from the alley, and the automatic barn cleaning device should follow a cleaning route calculated by the barn cleaning control unit based on the identified locations (or a subset thereof). In this case we assume that the automatic barn cleaning device can handle the manure in all 5 locations without an intermediate depletion at the drain or an intermediate battery charge. The calculation of a route may be based on an approximation of the so-called Travelling Salesman Problem, TSP, where "cities" instead are locations of manure, and the "salesman" is the automatic barn cleaning device. A number of alternative routes are derived and compared, and the shortest route alternative is selected. FIG. 4a shows the "winning" (and thus selected) route in form of solid arrows between the locations and from the automatic barn cleaning device to the first location. Optionally, the drain "Y" could be included as an end location for the route, as shown in FIG. 4a. The route d-a-b-e-c-Y is signaled to the automatic barn cleaning device, which starts cleaning. The actual path of the automatic barn cleaning device may adapted to the automatic barn cleaning device's ability to take curves while still holding the manure, i.e. the curve taking may be rounder, more spline-like than shown in the figure.

Figure 4B:
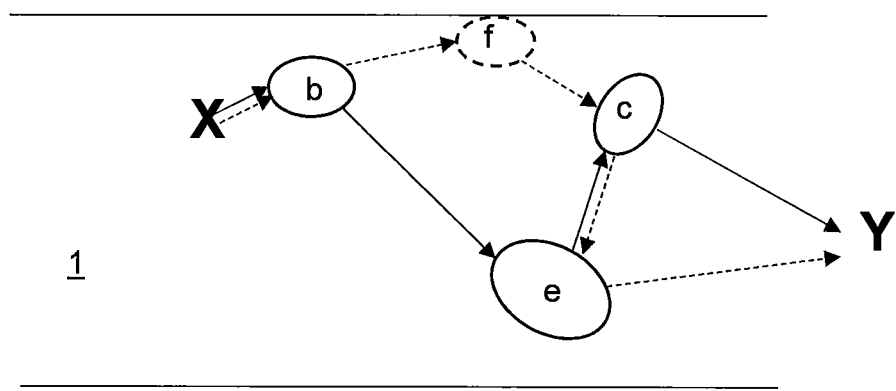

Five minutes later, a new manure location, f, is identified, shown in FIG. 4b. The automatic barn cleaning device position "X" has now changed as it is on its way towards location c (d and a are already cleared). Since a new location f is identified, a new route is calculated, and now the route b-f-c-e-Y is the shortest, and thereby "best" in this example. The new, more recently calculated route (dashed arrows) is signaled to the automatic barn cleaning device to replace the old route (solid arrows), and the automatic barn cleaning device continues the cleaning according to the new route (dashed arrows). Also here, we assume that the automatic barn cleaning device had capacity enough to handle also the additional manure location f without an intermediate depletion or battery charge.

Figure 5A:
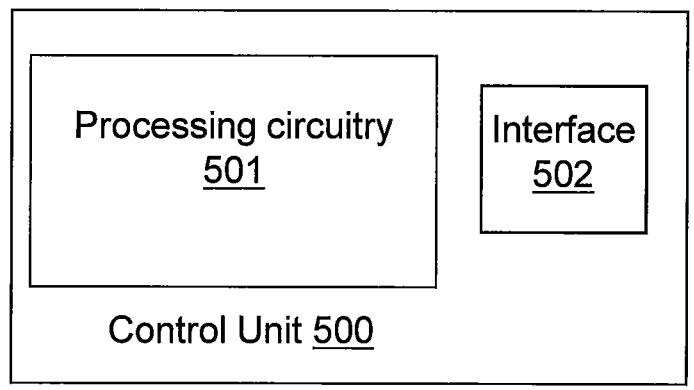
FIGS. 5a-5b are schematic block diagrams illustrating implementations of a barn cleaning control unit according to exemplifying embodiments.

An exemplifying embodiment of a control unit is illustrated in a general manner in FIG. 5a.

The control unit 500 should be considered as a functional unit, which may be implemented by one or several physical units. In other words, the control unit is in some embodiments a control arrangement. For example, the control unit could be a part of a central system or arrangement for controlling a plurality of barn equipment.

The control unit is operable obtain information from one or more cameras; identifying at least one location being subjected to manure based on the obtained information; to calculate a route for the automatic barn cleaning device based on the identified at least one location, and to control automatic barn cleaning device based on the calculated route. That is, it is operable to control the automatic barn cleaning device to perform actions in response to information obtained from one or more cameras and also possibly from the automatic barn cleaning device and/or an RTLS system or similar.

The communication between the control unit and other entities may be performed over a state of the art wireless and/or wired interface 502. The control unit 500 is configured to perform the actions of at least one of the method embodiments described above. The control unit 500 is associated with the same technical features, objects and advantages as the previously described method embodiments. The control unit will be described in brief in order to avoid unnecessary repetition.

Figure 5B:
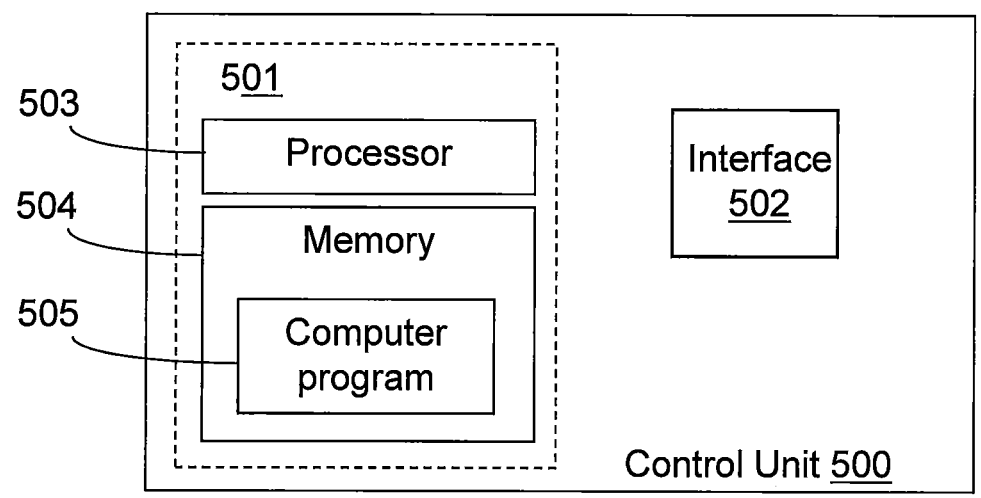

The control unit may be implemented and/or described as follows, FIG. 5b:

The control unit 500 comprises hardware and software. The hardware, or processing circuitry 501, is for example various electronic components on a for example a Printed Circuit Board, PCB. The most important of those components is typically a processor 503, for example a microprocessor, along with a memory, 504, for example EPROM or a Flash memory chip.

The control unit 500 comprises a communication interface 502, for example I/O interface or other communication bus. The interface 502, includes a wireless, and possibly a wired, interface for sending data, such as commands, to other nodes or entities, and for obtaining/receiving information from other nodes or entities.

The memory 504, which is in communication with the processor 503, that stores or holds instruction code readable and executable by the processor 503. The instruction code stored or held in the memory may be in the form of a computer program 505, which when executed by the processor 503 causes the control unit 500 to perform the actions in the manner described above.

The terminology used in the description of the embodiments as illustrated in the accompanying drawings is not intended to be limiting of the described method; control unit or computer program. Various changes, substitutions and/or alterations may be made, without departing from disclosure embodiments as defined by the appended claims.

The term "or" as used herein, is to be interpreted as a mathematical OR, that is, as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as for example a processor may fulfil the functions of several items recited in the claims.

The invention claimed is:

1. A method for barn cleaning to be applied by a barn cleaning control unit, the method comprising:
obtaining information from one or more cameras mounted to capture images of an area of operation of an automatic barn cleaning device, the automatic barn cleaning device having a current capacity of manure that can be displaced or collected;
identifying a plurality of locations in said area of operation subjected to manure, and estimating an amount of the manure present at the identified locations, based on the obtained information;
calculating a route for the automatic barn cleaning device based on the identified plurality of locations and the estimated amount of the manure, by selecting a subset of the identified locations, for which subset a total estimated amount of the manure is within the current capacity of manure that can be displaced or collected by the automatic barn cleaning device; and
controlling the automatic barn cleaning device based on the calculated route.

2. The method according to claim 1, wherein the controlling comprises:
triggering the automatic barn cleaning device to navigate according to the calculated route.

3. The method according to claim 1, further comprising:
determining a current position of the automatic barn cleaning device.

4. The method according to claim 1, wherein the calculating the route further comprises selecting the path from the alternative paths that maximizes an estimated amount of manure traversed by said path one or more of: (i) per length unit and (ii) per time unit.

5. The method according to claim 1, wherein the calculating the route comprises calculating a shortest path, starting from a position of the automatic barn cleaning device, passing through a plurality of identified locations.

6. The method according to claim 1, wherein the automatic barn cleaning device is a robot configured to be controlled to navigate in two physical dimensions.

7. The method according to claim 1, wherein the plurality of identified locations fulfill at least one predefined criterion selected from:
(i) an estimated total amount of manure present in the locations,
(ii) a predicted energy consumption of the automatic barn cleaning device when traversing the alternative paths passing through the locations,
(iii) a maximum amount of manure to be collected when traversing the alternative paths,
(iv) a minimum amount of manure to be collected when traversing the alternative paths,
(v) a minimum number of the identified locations to be traversed by the alternative paths, and
(vi) a length of the alternative paths passing through the identified locations.

8. The method according to claim 1, further comprising determining the current capacity based on:
a maximum capacity of manure that can be displaced or collected when the automatic barn cleaning device is empty; and
an amount of the manure that the barn cleaning device has displaced or collected since the barn cleaning device was last emptied or drained.

9. A barn cleaning arrangement comprising:
an automatic barn cleaning device; and
a barn cleaning controller operable to control an automatic barn cleaning device, the controller being configured to:
obtain information from one or more cameras, said information being related to an area of operation of an automatic barn cleaning device, the automatic barn cleaning device having a current capacity of manure that can be displaced or collected;
identify a plurality of locations in said area of operation being subjected to manure, and estimating an amount of the manure present at the identified locations, based on the obtained information;
calculate a route for the automatic barn cleaning device based on the identified plurality of locations and the estimated amount of the manure, by selecting a subset of the identified locations, for which subset a total estimated amount of the manure is within the current capacity of manure that can be displaced or collected by the automatic barn cleaning device; and
control the automatic barn cleaning device based on the calculated route.

10. The barn cleaning arrangement of claim 9, further comprising:
one or more cameras operable to provide information related to an area of operation of the automatic barn cleaning device.

11. A barn cleaning controller operable to control an automatic barn cleaning device, the controller being configured to:
obtain information from one or more cameras, said information being related to an area of operation of an automatic barn cleaning device, the automatic barn cleaning device having a current capacity of manure that can be displaced or collected;
identify a plurality of locations in said area of operation being subjected to manure, and estimating an amount of the manure present at the identified locations, based on the obtained information;
calculate a route for the automatic barn cleaning device based on the identified plurality of locations and the estimated amount of the manure, by selecting a subset of the identified locations, for which subset a total estimated amount of the manure is within the current capacity of manure that can be displaced or collected by the automatic barn cleaning device; and
control the automatic barn cleaning device based on the calculated route.

12. The barn cleaning controller according to claim 11, wherein the controller is further configured to:
determine a current position of the automatic barn cleaning device, and the route being calculated based on the determined current position of the automatic barn cleaning device.

13. The barn cleaning controller according to claim 11, wherein, in calculating the route, the controller is further configured to select the path from the alternative paths that maximizes an estimated amount of manure traversed by said path one or more of (i) per length unit and (ii) per time unit.

14. The barn cleaning controller according to claim 11, wherein the calculating the route comprises calculating a shortest path, starting from a position of the automatic barn cleaning device, passing through a plurality of identified locations.

15. The barn cleaning controller according to claim 11, wherein the plurality of identified locations fulfill at least one predefined criterion selected from:
   (i) an estimated total amount of manure present in the locations,
   (ii) a predicted energy consumption of the automatic barn cleaning device when traversing the alternative paths passing through the locations,
   (iii) a maximum amount of manure to be collected when traversing the alternative paths,
   (iv) a minimum amount of manure to be collected when traversing the alternative paths,
   (v) a minimum number of the identified locations to be traversed by the alternative paths, and
   (vi) a length of the alternative paths passing through the identified locations.

16. The barn cleaning controller according to claim 11, wherein the barn cleaning controller is further configured to determine the current capacity based on:
   a maximum capacity of manure that can be displaced or collected when the automatic barn cleaning device is empty; and
   an amount of the manure that the barn cleaning device has displaced or collected since the barn cleaning device was last emptied or drained.

* * * * *